United States Patent
Kishimoto et al.

(10) Patent No.: US 8,390,421 B2
(45) Date of Patent: Mar. 5, 2013

(54) SEMICONDUCTOR CERAMIC AND POSITIVE-COEFFICIENT CHARACTERISTIC THERMISTOR

(75) Inventors: Atsushi Kishimoto, Nagaokakyo (JP); Wataru Aoto, Nagaokakyo (JP); Akinori Nakayama, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/326,706

(22) Filed: Dec. 15, 2011

(65) Prior Publication Data

US 2012/0081206 A1   Apr. 5, 2012

Related U.S. Application Data

(63) Continuation of application No. PCT/JP2010/061142, filed on Jun. 30, 2010.

(30) Foreign Application Priority Data

Jul. 1, 2009   (JP) ................................. 2009-156916

(51) Int. Cl.
*H01C 7/10*   (2006.01)
(52) U.S. Cl. ................. 338/22 R; 338/309; 338/320
(58) Field of Classification Search ............... 338/22 R, 338/309
See application file for complete search history.

(56) References Cited

U.S. PATENT DOCUMENTS

| | | | |
|---|---|---|---|
| 6,542,067 B1* | 4/2003 | Kawamoto | 338/22 R |
| 6,911,102 B2* | 6/2005 | Niimi | 156/89.14 |
| 8,009,012 B2* | 8/2011 | Kajino et al. | 338/309 |
| 2004/0084132 A1* | 5/2004 | Niimi | 156/89.14 |
| 2009/0027158 A1* | 1/2009 | Kajino et al. | 338/22 R |

FOREIGN PATENT DOCUMENTS

| | | |
|---|---|---|
| JP | 56158401 A | 12/1981 |
| JP | 3038802 A | 2/1991 |
| JP | 4104951 A | 4/1992 |
| JP | 7014702 A | 1/1995 |
| JP | 2000016866 A | 1/2000 |

OTHER PUBLICATIONS

Written Opinion of the International Searching Authority, mailed Aug. 17, 2010.

* cited by examiner

*Primary Examiner* — Kyung Lee
(74) *Attorney, Agent, or Firm* — Dickstein Shapiro LLP

(57) ABSTRACT

A semiconductor ceramic and a positive-coefficient characteristic thermistor are provided which have a stable PTC characteristic, a high double point, and a wide operating temperature range. The semiconductor ceramic contains, as a main component, a barium titanate-based composition having a perovskite structure expressed by a general formula $A_mBO_3$. Out of 100 mol % of the Ti, an amount in a range of 0.05 mol % or more to 0.3 mol % or less of Ti is replaced with W as a semiconductor forming agent, the ratio m of A sites mainly to B sites is $0.99 \leq m \leq 1.002$, and an actually-measured sintered density is 70% or more and 90% or less of the theoretical sintered density. In the positive-coefficient characteristic thermistor, a component body is formed of the semiconductor ceramic.

20 Claims, 2 Drawing Sheets

SEMICONDUCTOR CERAMIC AND POSITIVE-COEFFICIENT CHARACTERISTIC THERMISTOR

This is a continuation of application Ser. No. PCT/JP2010/061142, filed Jun. 30, 2010, the entire contents of which is incorporated herein by reference.

TECHNICAL FIELD

The present invention relates to a semiconductor ceramic and a positive-coefficient characteristic thermistor, and more particularly to a semiconductor ceramic having a Positive Temperature Coefficient (hereinafter referred to as a "PTC characteristic") and a positive-coefficient characteristic thermistor used in a heater, etc.

BACKGROUND ART

A barium titanate ($BaTiO_3$)-based semiconductor ceramic has a PTC characteristic that its resistance value abruptly increases as a temperature exceeds its Curie point Tc. Therefore, the barium titanate ($BaTiO_3$)-based semiconductor ceramic is widely utilized as an overcurrent protective element for a circuit or as a degaussing element for a Braun tube frame of a TV.

For example, Patent Literature (PTL) 1 discloses a semiconductor ceramic that is given a PTC characteristic by adding 0.005 to 1 mol % of W to a ceramic containing $BaTiO_3$ as a main component.

CITATION LIST

PTL 1: Japanese Unexamined Patent Application Publication No. 7-14702

SUMMARY OF INVENTION

Technical Problem

In the above-described related art, however, the temperature at which the resistance value of the semiconductor ceramic becomes double the resistance value at 25° C. (hereinafter referred to as the "double point") is relatively low. This causes a problem in that a change in the resistance value with respect to temperature change is increased in a low-temperature region which is lower than the Curie point and a stable resistance value is not obtained. Another problem is that the temperature range where a low resistance value is obtained is narrow and the operating temperature range is limited. Accordingly, the present invention is intended to solve the problems described above, and an object of the present invention is to provide a semiconductor ceramic and a positive-coefficient characteristic thermistor, which have a stable PTC characteristic, a high double point, and a wide operating temperature range.

Solution To Problem

To achieve the above object, the present invention provides a semiconductor ceramic containing, as a main component, a $Ba_mTiO_3$-based composition having a perovskite structure expressed by a general formula $A_mBO_3$, wherein 0.05 mol % or more to 0.3 mol % or less of 100 mol % of Ti is replaced with W as a semiconductor forming agent, the ratio m of A sites mainly occupied by Ba to B sites mainly occupied by Ti is $0.99 \leq m \leq 1.002$, and an actually-measured sintered density is 70% or more and 90% or less of theoretical sintered density.

According to the present invention, the semiconductor ceramic preferably contains Ca in a range of 15 mol % or less of the total mol number of elements constituting the A sites.

The semiconductor ceramic preferably contains Ca in a range of 2 mol % or more to 15 mol % or less of the A site elements.

Further, the present invention provides a positive-coefficient characteristic thermistor including a pair of external electrodes formed on a surface of a component body, wherein the component body is formed of the semiconductor ceramic described above.

Advantageous Effects of Invention

Since the present invention provides the semiconductor ceramic containing, as a main component, a $Ba_mTiO_3$-based composition having a perovskite structure expressed by a general formula $A_mBO_3$, in which of 100 mol % of Ti, 0.05 mol % or more to 0.3 mol % or less of the Ti is replaced with W as a semiconductor forming agent, the ratio m of A sites mainly occupied by Ba to B sites mainly occupied by Ti is $0.99 \leq m \leq 1.002$, and the actually-measured sintered density is 70% or more and 90% or less of the theoretical sintered density, the semiconductor ceramic having a stable PTC characteristic, a high double point, and a wide operating temperature range can be obtained.

DESCRIPTION OF EMBODIMENTS

An embodiment of the present invention will be described below.

Figure 1:
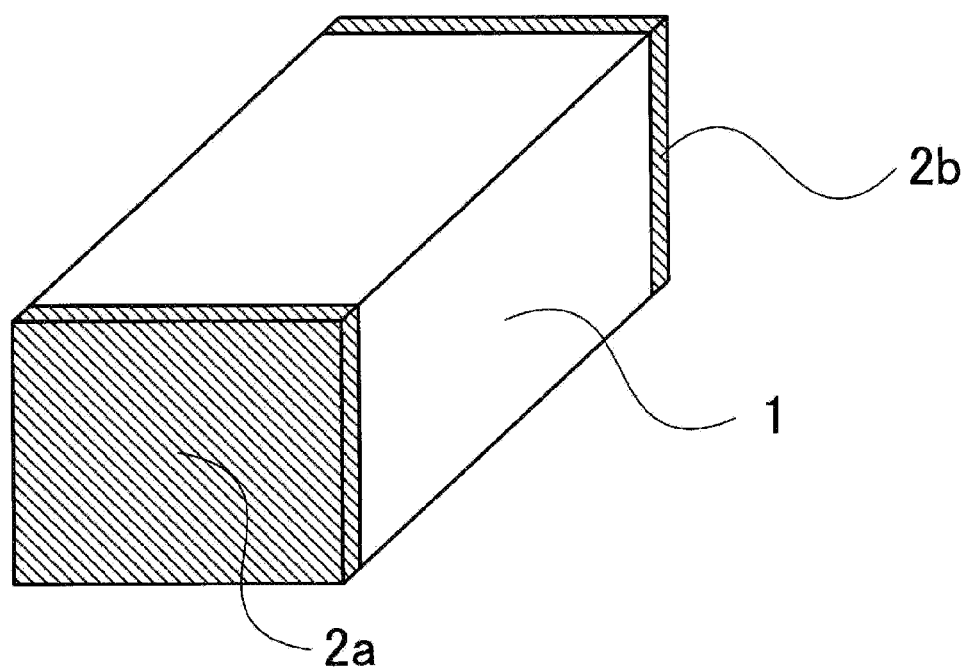
FIG. 1 is a schematic perspective view of a multilayer positive-coefficient characteristic thermistor according to one embodiment of the present invention.

FIG. 1 is a schematic perspective view of a multilayer positive-coefficient characteristic thermistor according to one embodiment of the present invention. It can be prepared as follows.

$BaCO_3$, $TiO_2$, $WO_3$ and $CaCO_3$ are prepared as starting materials. The starting materials are weighed such that a semiconductor ceramic after sintering has a composition of $(Ba_{1-y}Ca_y)_m(Ti_{100-x}W_x)O_3$, and that the contents of W and Ca are expressed by composition formulae given in Tables 1 and 2.

The value m in Tables 1 and 2 represents the ratio of A sites mainly occupied by Ba to B sites mainly occupied by Ti, i.e., A sites/B sites.

Pure water is added to the starting materials, and a resulting mixture is mixed and pulverized for 10 hours in a ball mill with PSZ balls. After drying, the mixture is calcined for 2 hours at 1100° C. Thereafter, the mixture is pulverized again in the ball mill with the PSZ balls, whereby calcined powder is obtained.

Next, an organic binder, a dispersant, and pure water are added to the calcined powder, and a ceramic slurry is obtained by mixing them for 12 hours in the ball mill together with the PSZ balls.

Subsequently, the obtained ceramic slurry is shaped into a sheet-like form by the doctor blade method. A ceramic green sheet having a thickness of 50 μm is thus fabricated after drying.

Several ceramic green sheets are stacked one above another, press-bonded, and cut to obtain a raw laminate which will have dimensions of 2 mm length, 1.25 mm width, and 1 mm thickness after sintering.

The raw laminate is subjected to a debinding process for 12 hours at 300° C. in the atmosphere. A ceramic base element is then obtained by sintering the raw laminate in a reducing atmosphere, in which the concentration of $H_2$ gas is adjusted to 3% by volume with respect to $N_2$ gas, for 2 hours at temperature within the range of 1120 to 1300° C. such that the relative density of a semiconductor ceramic after the sintering takes corresponding one of values listed in Tables 1 and 2.

Next, a semiconductor ceramic is obtained by carrying out a reoxidation process, including a heat-treatment at temperature of 700° C. in the atmosphere, on the above-mentioned ceramic base element.

A ceramic body 1 is obtained by barrel-polishing the surface of the semiconductor ceramic after the reoxidation. External electrodes 2a and 2b each having a three-layer structure are formed on both end surfaces of the ceramic body 1 by successively carrying out sputtering while Cr, Ni and Ag are in turn used as targets. Multilayer positive-coefficient characteristic thermistors of Sample Nos. 1 to 19 are fabricated as described above.

For each of Samples Nos. 1 to 19, the relative density and the double point were measured.

The relative density was defined as a ratio of the actually-measured sintered density to the theoretical sintered density. The actually-measured sintered density was measured in terms of bulk density. Also, the double point was defined as a temperature at which the resistance value of the multilayer positive-coefficient characteristic thermistor became double the resistance value at 25° C. The resistance value was measured by the 4-terminal method.

The change to a semiconductor was determined to be true when the resistance value of the multilayer positive-coefficient characteristic thermistor was $10^{10}\Omega$ or less at 25° C.

Development of the PTC characteristic was determined to be true when the PTC digit number ΔR, i.e., an index indicating the ability of the positive-coefficient characteristic thermistor, was 3.0 or more.

As expressed by a formula (1) given below, the PTC digit number ΔR is defined as the logarithm of a ratio of a maximum value $\rho_{max}$ of electrical resistivity of the semiconductor ceramic, which is used as the ceramic body of the positive-coefficient characteristic thermistor, to a value $\rho_{25}$ at 25° C.

$$\Delta R = \log(\rho_{max}/\rho_{25}) \quad (1)$$

TABLE 1

| Sample No. | $Ba_m(Ti_{100}W_x)O_3$ W Content x (mol %) | m | Relative Density (%) | Double Point (° C.) | Change to Semi-conductor | Development of PTC Characteristic |
|---|---|---|---|---|---|---|
| 1* | 0.02 | 0.996 | 70 | — | X | X |
| 2 | 0.05 | 0.996 | 75 | 103 | ○ | ○ |
| 3 | 0.1 | 0.996 | 80 | 115 | ○ | ○ |
| 4 | 0.2 | 0.996 | 80 | 120 | ○ | ○ |
| 5 | 0.3 | 0.996 | 80 | 110 | ○ | ○ |
| 6* | 0.4 | 0.996 | 85 | 90 | ○ | ○ |
| 7* | 0.1 | 0.985 | 75 | 95 | ○ | ○ |
| 8 | 0.1 | 0.990 | 80 | 105 | ○ | ○ |
| 9 | 0.1 | 1.002 | 85 | 115 | ○ | ○ |
| 10* | 0.1 | 1.005 | 95 | — | ○ | X |
| 11* | 0.1 | 0.996 | 60 | 85 | ○ | ○ |
| 12 | 0.1 | 0.996 | 70 | 115 | ○ | ○ |
| 13 | 0.1 | 0.996 | 90 | 115 | ○ | ○ |
| 14* | 0.1 | 0.996 | 95 | — | ○ | X |

*Outside the scope of the present invention

As seen from Table 1, good characteristics, i.e., the development of the PTC characteristic and a double point of 100° C. or higher, are obtained in Sample Nos. 2 to 5, 8, 9, 12 and 13 in which, out of 100 mol % of Ti, an amount in the range of 0.05 mol % or more to 0.3 mol % or less of the Ti is replaced with W as a semiconductor forming agent, m is in the range of 0.99 to 1.002, and the relative density is in the range of 70 to 90%. Better characteristics, including the double point of 105° C. or higher, are obtained particularly in Sample Nos. 3 to 5, 8, 9, 12 and 13 in which a value in the range of 0.1 mol % or more to 0.3 mol % or less of 100 mol % of Ti is replaced with W as the semiconductor forming agent.

In Sample No. 1 in which the W content departs from the scope of the present invention to the smaller side, the ceramic is not changed to a semiconductor. In Sample No. 6 in which the W content departs from the scope of the present invention to the larger side, the double point becomes lower than 100° C., thus resulting in an undesired result.

Further, the double point is lower than 100° C. in Sample No. 7 where m departs from the scope of the present invention to the smaller side. In Sample No. 10 in which m departs from the scope of the present invention to the larger side, the PTC characteristic is not developed, thus resulting in an undesired result.

Moreover, the double point is lower than 100° C. in Sample No. 11 where the relative density departs from the scope of the present invention to the smaller side. In Sample No. 14 in which the relative density departs from the scope of the present invention to the larger side, the PTC characteristic is not developed, thus resulting in an undesired result.

TABLE 2

| Sample No. | $(Ba_{1-y}Ca_y)_m(Ti_{100-x}W_x)O_3$ W Content x (mol %) | Ca Content y (mol %) | M | Relative Density (%) | Double Point (° C.) | Change to Semi-conductor | Development of PTC Characteristic |
|---|---|---|---|---|---|---|---|
| 15 | 0.1 | 0 | 0.996 | 80 | 115 | ○ | ○ |
| 16 | 0.1 | 1 | 0.996 | 80 | 117 | ○ | ○ |
| 17 | 0.1 | 2 | 0.996 | 80 | 121 | ○ | ○ |
| 18 | 0.1 | 5 | 0.996 | 80 | 123 | ○ | ○ |
| 19 | 0.1 | 15 | 0.996 | 80 | 129 | ○ | ○ |

Sample No. 15 in Table 2 is the same as Sample No. 3 in Table 1.

As seen from Table 2, good characteristics, i.e., the development of the PTC characteristic and a double point of 100° C. or higher, are obtained in Sample Nos. 15 to 19 in which the W content is 0.1 mol %, m is 0.996, the relative density is 80%, and the Ca content is in the range of 15 mol % or less. In those samples, the double point is increased in comparison with that in the samples not containing Ca. Also, the double point is similarly increased in the Ca samples in which the W content is in the range of 0.05 to 0.3 mol %, m is in the range of 0.99 to 1.002, and the relative density is in the range of 70 to 90%, in comparison with that in the samples not containing Ca.

More preferably, better characteristics are seen with a double point of 120° C. or higher in addition to the development of the PTC characteristic in Sample Nos. 17 to 19 where the Ca content is in the range of 2 to 15 mol %. If the Ca content is in excess of 15 mol %, Ca is less apt to dissolve in a solid state.

Figure 2:
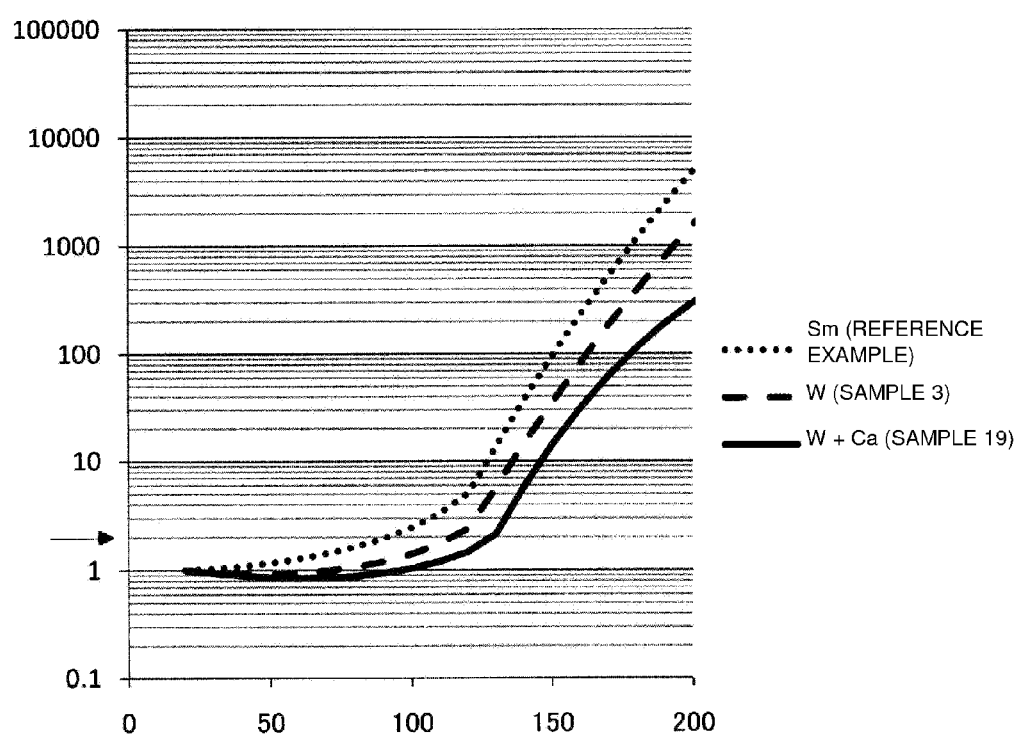
FIG. 2 is a graph plotting respective PTC characteristics of a reference example, Sample 3, and Sample 19.

FIG. 2 is a graph plotting respective PTC characteristics of Sample 3, Sample 19, and a reference example. The reference example is fabricated using the same composition and the same producing method as those in Sample 3 except that Sm is used as the semiconductor forming agent instead of W and the Sm is substituted for 0.2 mol % of Ba out of 100 mol % of Ba. The reason why Sm is substituted for 0.2 mol % of Ba in the reference example resides in that, because Sm differs in valence from W, respective valences of Sm and W need to be adjusted such that the respective numbers of conduction electrons are equal to each other. The vertical axis in FIG. 2 represents the resistance value ($\Omega$) in a log scale, and the horizontal axis represents temperature (° C.). The resistance value denoted by an arrow along the vertical axis corresponds to the double point.

FIG. 2 shows that the temperature corresponding to the double point is higher in Sample 3 containing W than in the reference example containing Sm by about 20° C. Also, Sample 19 with both W and Ca provides the advantageous characteristic of increasing the double point to be higher than that in Sample 3 by about 10° C. and higher than that in the reference example by about 30° C. Further, FIG. 2 indicates that in each of Sample 3 and Sample 19, the PTC curve representing the PTC characteristic temporarily declines in a temperature range lower than the flexion point of the PTC curve and then gently rises, i.e., it exhibits a U-shaped resistance change.

While the positive-coefficient characteristic thermistor described in the foregoing embodiment includes no internal electrodes, it may include the internal electrodes. In that case, the internal electrodes are made of a material, e.g., Ni or Cu, which provides Ohmic features with respect to the positive-coefficient characteristic thermistor.

REFERENCE SIGNS LIST 1 ceramic body
2a, 2b external electrode

The invention claimed is:

1. A semiconductor ceramic containing, as a main component, a barium titanate-based composition having a perovskite structure expressed by a general formula $A_mBO_3$, wherein
0.05 mol % or more to 0.3 mol % or less of 100 mol % of the Ti is replaced with W,
the ratio m of A sites to B sites is $0.99 \leq m \leq 1.002$,
an actually-measured sintered density is 70% or more and 90% or less of theoretical sintered density, and
the double point is at least 100° C.

2. The semiconductor ceramic according to claim 1, wherein the A site of the semiconductor ceramic contains Ca in a range of 15 mol % or less based on the total mol number of elements constituting the A site is 100 mol %.

3. The semiconductor ceramic according to claim 2, wherein the semiconductor ceramic contains Ca in a range of 2 mol % or more to 15 mol % or less.

4. The semiconductor ceramic according to claim 3, wherein 0.1 mol % to 0.3 mol % of 100 mol % of the Ti is replaced with W.

5. The semiconductor ceramic according to claim 4, wherein the actually-measured sintered density is at least 75%.

6. The semiconductor ceramic according to claim 2, wherein 0.1 mol % to 0.3 mol % of 100 mol % of the Ti is replaced with W.

7. The semiconductor ceramic according to claim 1, wherein 0.1 mol % to 0.3 mol % of 100 mol % of the Ti is replaced with W.

8. The semiconductor ceramic according to claim 1, wherein the actually-measured sintered density is at least 75%.

9. A positive-coefficient characteristic thermistor comprising a pair of external electrodes disposed on a surface of a component body,
wherein the component body is a perskovite semiconductor ceramic of the formula

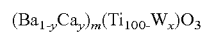

in which $0 \leq y \leq 15$, $0.05 \leq x \leq 0.3$, $0.99 \leq m \leq 1.002$, has an actually-measured sintered density of 70 to 90%, and the double point is at least 100° C.

10. The positive-coefficient characteristic thermistor according to claim 9 in which y is 0.

11. The positive-coefficient characteristic thermistor according to claim 10 in which x is at least 0.1.

12. The positive-coefficient characteristic thermistor according to claim 11 in which the actually-measured sintered density is at least 75%.

13. The positive-coefficient characteristic thermistor according to claim 9 in which y is at least 2.

14. The positive-coefficient characteristic thermistor according to claim 13 in which x is at least 0.1.

15. The positive-coefficient characteristic thermistor according to claim 14 in which the actually-measured sintered density is at least 75%.

16. The positive-coefficient characteristic thermistor according to claim 9 in which x is at least 0.1.

17. The positive-coefficient characteristic thermistor according to claim 16 in which the actually-measured sintered density is at least 75%.

18. The positive-coefficient characteristic thermistor according to claim 9 in which the actually-measured sintered density is at least 75%.

19. The positive-coefficient characteristic thermistor according to claim 9 in which the double point is at least 105° C.

20. The semiconductor ceramic according to claim 1 in which the double point is at least 105° C.

* * * * *